United States Patent
Brunn et al.

(10) Patent No.: US 9,590,999 B2
(45) Date of Patent: Mar. 7, 2017

(54) PREVIEW SERVING FROM AN EXTERNAL PREVIEW SERVICE

(71) Applicant: International Business Machines Corporation, Armonk, NY (US)

(72) Inventors: Jonathan F. Brunn, Logan, UT (US); Sheng Hu, Beijing (CN); Bo Min Nie, Beijing (CN); Yu Zhuang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/667,790

(22) Filed: Mar. 25, 2015

(65) Prior Publication Data

US 2016/0285882 A1 Sep. 29, 2016

(51) Int. Cl.
*H04L 29/06* (2006.01)
*H04L 29/08* (2006.01)

(52) U.S. Cl.
CPC .......... *H04L 63/102* (2013.01); *H04L 63/061* (2013.01); *H04L 63/0807* (2013.01); *H04L 63/0823* (2013.01); *H04L 67/2842* (2013.01)

(58) Field of Classification Search
CPC . H04L 63/102; H04L 63/061; H04L 63/0807; H04L 63/0823; H04L 63/2842
See application file for complete search history.

(56) References Cited

U.S. PATENT DOCUMENTS

| | | | |
|---|---|---|---|
| 7,136,850 B2* | 11/2006 | Keller | G06F 17/30469 |
| 7,562,397 B1 | 7/2009 | Mithal et al. | |
| 8,745,481 B1* | 6/2014 | Ulm | G06F 17/211 |
| | | | 715/201 |
| 2005/0004875 A1* | 1/2005 | Kontio | G06F 21/10 |
| | | | 705/52 |
| 2008/0027928 A1* | 1/2008 | Larson | G06F 17/30864 |

OTHER PUBLICATIONS

Shaikfayaz et al. (Delete records based on timestamp from a table, IBMMAINFRAMES.com Support Forums >DB2, Nov. 27, 2008, 3 pages).*

(Continued)

*Primary Examiner* — Oleg Korsak
(74) *Attorney, Agent, or Firm* — Cantor Colburn LLP; Rahan Uddin

(57) ABSTRACT

Embodiments relate to preview serving of content previews from a preview service for a component having associated content. A filter of a layered preview service executing on a processor receives a request from a client consumer for a feed from the component. The filter identifies a content reference returned by the component in response to the request for the feed. The filter establishes an association between the content reference and a user identifier of the client consumer as an authorization record. A preview service receives a preview request including the user identifier and a content identifier. The authorization record is checked to determine whether the content identifier matches the content reference for the user identifier. A content preview of the associated content as identified by the content identifier is served based on determining that a match exists.

12 Claims, 6 Drawing Sheets

(56) References Cited

OTHER PUBLICATIONS

Anonymously, "Method and System for Variable Access Control," An IP.com Prior Art Database Technical Disclosure, http://ip.com/IPCOM/000224458D, Dec. 20, 2012, 8 pages.

Download multiple files in one http request, retrieved from the Internet: http://www.mobit.com/tips/detpg__multiple-files-one-request/ on Nov. 13, 2014, 6 pages.

IBM, "Instant Messenger Response Previews and Overlays," An IP.com Prior Art Database Technical Disclosure, http://ip.com/IPCOM/000139588D, Aug. 29, 2006, 7 pages.

MHTML, Retrieved from the internet: http://en.wikipedia.org/wiki/MHTML on Nov. 13, 2014, 4 pages.

\* cited by examiner

PREVIEW SERVING FROM AN EXTERNAL PREVIEW SERVICE

BACKGROUND

The present disclosure relates to access control of computer-readable content and, more specifically, to preview serving of computer-readable content from an external preview service.

In a complex collaborative or social software offering, files may be stored in a number of places. For instance, in IBM Connections and SmartCloud, files may exist in Connections files, Connections Content Manager, as attachments to a number of services including wilds, forums, blogs, in mail messages, in chat file transfers, in virtual meeting rooms, and other places. In all these cases, it is often desirable to give the end user a preview of the file, be it a document, large image, video or other file. Often previews are displayed in large sets, from just a few to sometimes displaying hundreds of small thumbnail previews on a single page view.

Each preview request may result in a call to the application controlling access. If all services are distributed among a number of servers, either the thumbnail service is not centralized, or at least some of the services will incur remote method invocations to the component which controls the content access. This is highly inefficient as, for example, fifty thumbnails on a page would result in fifty such remote calls and could result in fifty database queries to check access.

Some efficiency may be found in batching preview requests so all the required thumbnails are returned in a single response. These responses may be part of a single response for all thumbnails, may be with hypertext markup language (HTML) of the page, or may be additional parts added to a feed of some kind. Batching typically improves performance but with significant added complexity to the client application. For instance, normal image tags and uniform resource locators (URLs) for single images may no longer be used, and a scripting language may be necessary to parse responses and lay out images in most cases. MIME HTML (MHTML) could potentially do this transparently, but MHTML is supported for archival, not service of, web pages. Use of these approaches also implies a very tight binding between the preview or thumbnail service and the application or component controlling access. The thumbnail or preview service becomes a feature of the component or application, which makes it difficult to apply across a number of independent services.

SUMMARY

According to an embodiment, a method is provided for serving content previews from a preview service for a component having associated content. A filter of a layered preview service executing on a processor receives a request from a client consumer for a feed from the component. The filter identifies a content reference returned by the component in response to the request for the feed. The filter establishes an association between the content reference and a user identifier of the client consumer as an authorization record. A preview service of the layered preview service receives a preview request including the user identifier and a content identifier. The authorization record is checked to determine whether the content identifier matches the content reference for the user identifier. A content preview of the associated content as identified by the content identifier is served based on determining that a match of the content identifier with the content reference for the user identifier exists in the authorization record.

According to another embodiment, a system is provided for serving content previews from a preview service for a component having associated content. The system includes a memory having computer readable instructions and a processor for executing the computer readable instructions. The computer readable instructions include receiving, at a filter of a layered preview service, a request from a client consumer for a feed from the component. The filter identifies a content reference returned by the component in response to the request for the feed. The filter establishes an association between the content reference and a user identifier of the client consumer as an authorization record. A preview service of the layered preview service receives a preview request including the user identifier and a content identifier. The authorization record is checked to determine whether the content identifier matches the content reference for the user identifier. A content preview of the associated content as identified by the content identifier is served based on determining that a match of the content identifier with the content reference for the user identifier exists in the authorization record.

According to a further embodiment, a computer program product is provided for serving content previews from a preview service for a component having associated content. The computer program product includes a computer readable storage medium having program code embodied therewith, the program code executable by a processor for receiving, at a filter of a layered preview service executing on the processor, a request from a client consumer for a feed from the component. The filter identifies a content reference returned by the component in response to the request for the feed. The filter establishes an association between the content reference and a user identifier of the client consumer as an authorization record. A preview service of the layered preview service receives a preview request including the user identifier and a content identifier. The authorization record is checked to determine whether the content identifier matches the content reference for the user identifier. A content preview of the associated content as identified by the content identifier is served based on determining that a match of the content identifier with the content reference for the user identifier exists in the authorization record.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
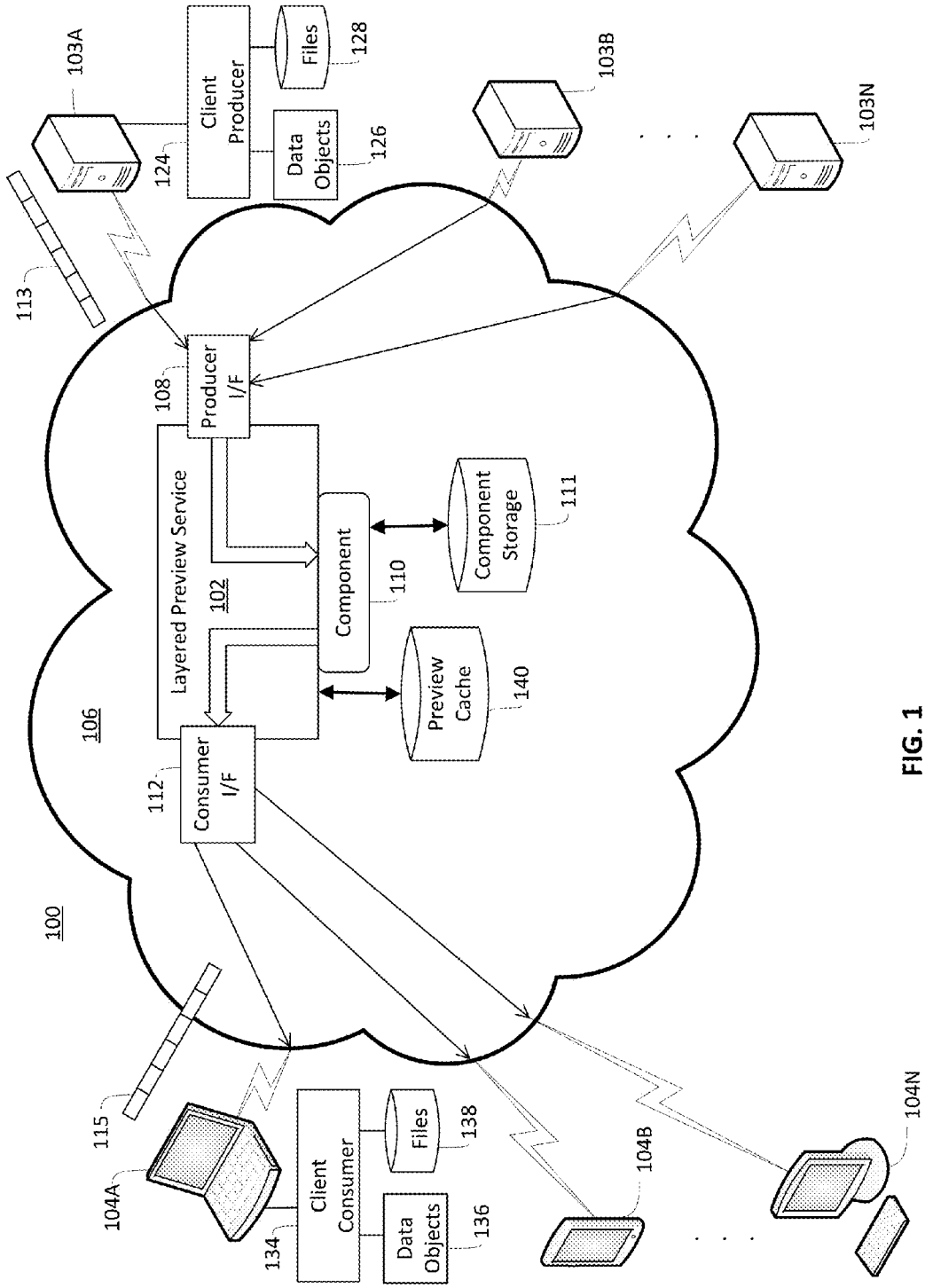
FIG. 1 depicts a block diagram of a system upon which preview serving may be implemented according to an embodiment.

Exemplary embodiments relate to preview serving in a network environment. Turning now to FIG. 1, an example of a system 100 upon which preview serving may be implemented will now be described in greater detail. The system 100 represents a networked environment, such as the Internet, where network-accessible content associated with one or more component applications is stored by one or more client producer devices 103A-N and retrieved by one or more client consumer devices 104A-N.

In the example depicted in FIG. 1, the system 100 includes the layered preview service 102 configured to communicate with one or more client producer devices 103A-N and client consumer devices 104A-N over a network 106. The network 106 may be any type of communications network known in the art and can include a combination of wireless, wired, and/or fiber optic links. Although only one layered preview service 102 is depicted in the network 106, it will be understood that there can be multiple layered preview services 102 which can interface with one or more component applications within the network 106 across a geographically wide area.

In exemplary embodiments, the layered preview service 102 is implemented on a high-speed processing device (e.g., a mainframe computer, an embedded computing device, or the like) including at least one processing circuit (e.g., a computer processor/CPU) capable of reading and executing instructions, and handling interactions with various components of the system 100. Alternatively, the layered preview service 102 can be embodied entirely in hardware including circuits and memory to perform processes as described herein. In the example of FIG. 1, the layered preview service 102 includes a producer interface 108 configured to interface the client producer devices 103A-N with one or more components 110, where only one component 110 is depicted in FIG. 1. The component 110 is an application having associated content stored in component storage 111 that can be previewed e.g., with thumbnail images. The layered preview service 102 also includes a consumer interface 112 configured to interface the client consumer devices 104A-N with the component 110.

In exemplary embodiments, the client producer devices 103A-N and the client consumer devices 104A-N can include a variety of computing devices with processing circuits and I/O interfaces, such as a keys/buttons, a touchscreen, audio input, a display device and audio output. The client producer devices 103A-N and the client consumer devices 104A-N may be embodied in any type of computing device known in the art, such as a laptop, tablet computer, mobile device, personal computer, workstation, server, and the like. Accordingly, the client producer devices 103A-N and the client consumer devices 104A-N can include various computer/communication hardware and software technology known in the art, such as one or more processing units or circuits, volatile and non-volatile memory including removable media, power supplies, network interfaces, support circuitry, operating systems, and the like.

In exemplary embodiments, one or more of the client producer devices 103A-N includes a client producer 124 configured to upload data objects 126 and/or files 128 as associated content of the component 110 in component storage 111. The client producer 124 can be implemented in software, hardware, or a combination thereof. As described herein, the data objects 126 and files 128 can be used interchangeably, for instance a file may be a type of data object. In general, the data objects 126 may reside in volatile memory of the client producer devices 103A-N, and the files 128 may reside in non-volatile memory of the client producer devices 103A-N; however, embodiments are not so constrained. The data objects 126 and files 128 may include any type of preview-able content, such as documents, images, video, spreadsheets, presentations, and the like.

Similarly, one or more of the client consumer devices 104A-N includes a client consumer 134 configured to receive data objects 136 and/or files 138 associated with the component 110, such as a feed from the component 110, associated content from component storage 111, or a content preview from a preview cache 140. The client consumer 134 can be implemented in software, hardware, or a combination thereof. As described herein, the data objects 136 and files 138 can be used interchangeably, for instance a file may be a type of data object. In general, the data objects 136 may reside in volatile memory of the client consumer devices 104A-N, and the files 138 may reside in non-volatile memory of the client consumer devices 104A-N. Accordingly, the client producer 124 can send a file or data object from the files 128 or data objects 126 to the layered preview service 102 via the producer interface 108 as a sequence of upload operations 113 including content to be retrieved by the client consumer 134. The client consumer 134 can receive component data 115 including feeds, content previews, and associated content via the consumer interface 112. The component data 115 can be analyzed by the client consumer 134 to render and/or store in the data objects 136 or files 138 for further use.

The layered preview service 102, component 110, component storage 111, and preview cache 140 can reside on separate servers in the network 106. The layered preview service 102 may provide filtering of file uploads, feed requests, feed responses, and preview requests to orchestrate actions with respect to the component 110, component storage 111, and preview cache 140. Decoupling of the component 110 from the preview cache 140 can enable secure preview generation and serving of content previews without substantially modifying the component 110. Authorization to content previews in the preview cache 140 is managed by the layered preview service 102.

Figure 2:
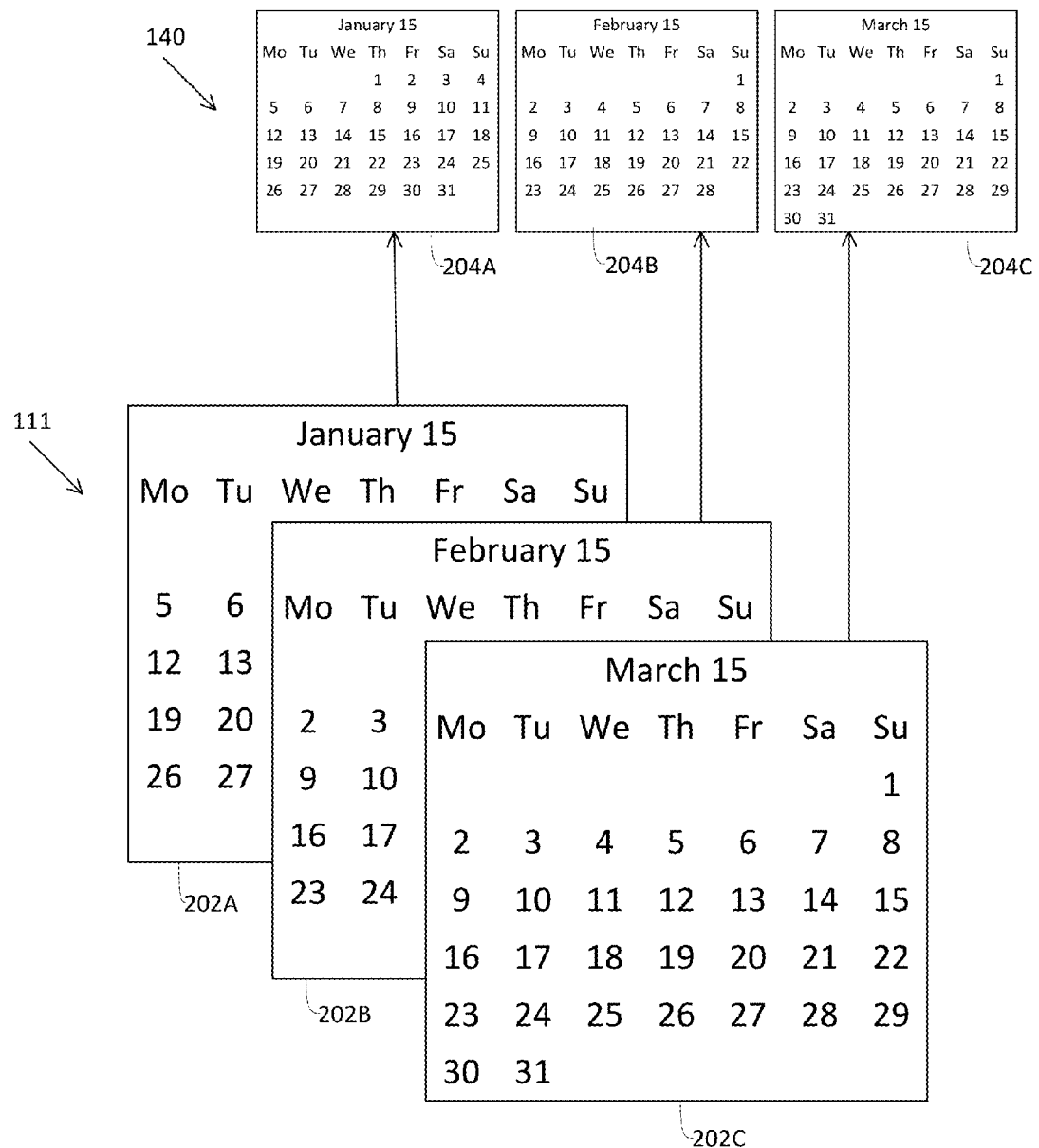
FIG. 2 depicts an example of content associated with a component and content previews according to an embodiment.

FIG. 2 depicts an example of content associated with a component and content previews according to an embodiment. In the example of FIG. 2, the component 110 of FIG. 1 is a calendar application, where calendar pages are stored as associated content 202A, 202B, and 202C in component storage 111 of FIG. 1. Upon uploading of the associated content 202A-202C, the layered preview service 102 of FIG. 1 may trigger generation of content preview 204A, 204B, and 204C as previews of the associated content 202A, 202B, and 202C respectively. The associated content 202A-202C may be interactive objects that store appointment data, holiday data, and time/date data, while the content previews 204A-204C are simply reduced-size images that provide a visual indication as to the associated content 202A-202C without including the underlying data. The content previews 204A-204C can be stored in the preview cache 140 of FIG.

1. Other examples of the types of content for which previews can be generated include larger image files, videos, documents, and the like.

Figure 3:
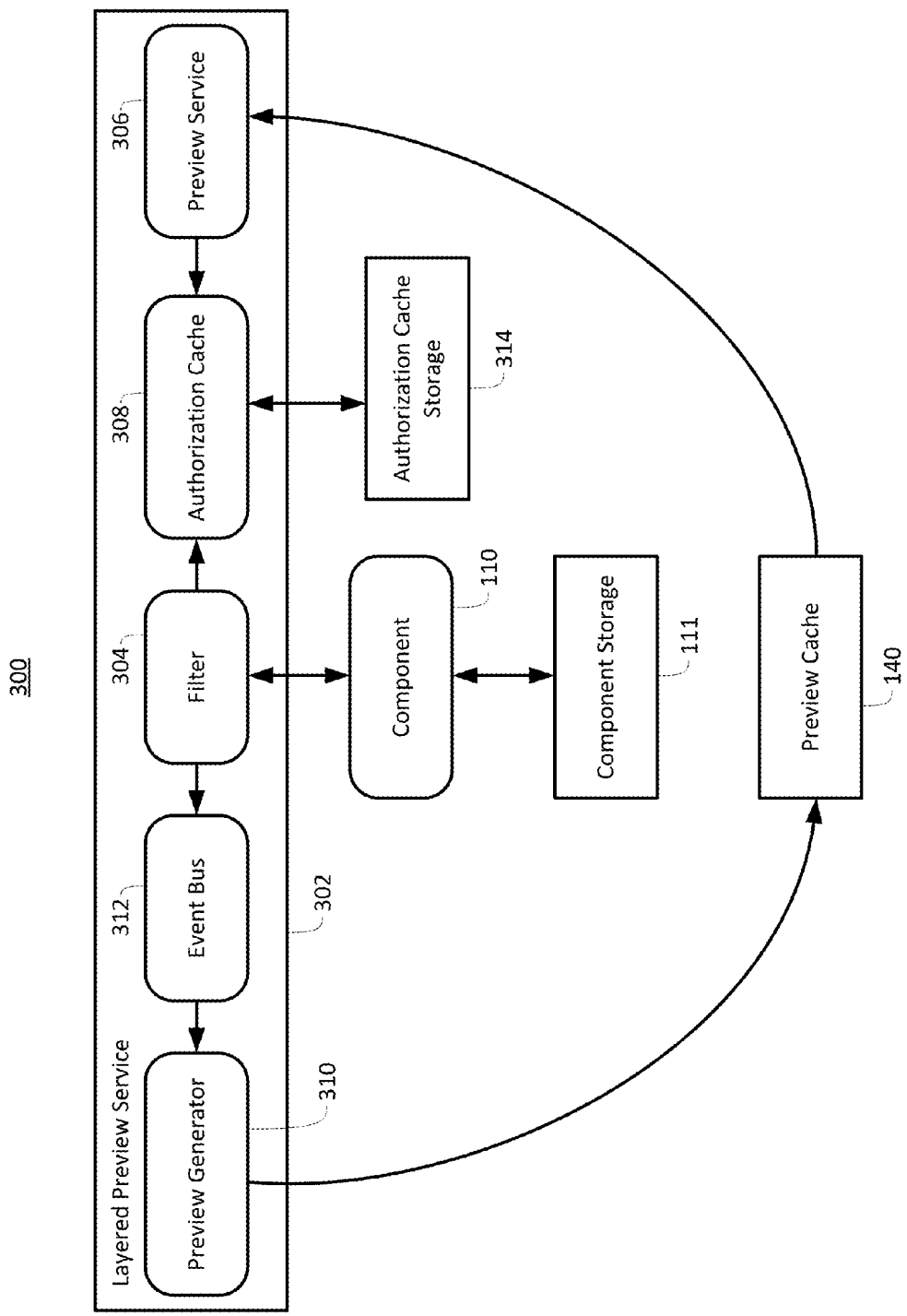
FIG. 3 depicts an example dataflow for preview serving according to an embodiment.

FIG. 3 depicts an example dataflow 300 for preview serving according to an embodiment. Layered preview service 302 of FIG. 3 is an embodiment of the layered preview service 102 of FIG. 1. In the example of FIG. 3, the layered preview service 302 includes a filter 304, a preview service 306, and an authorization cache 308. The layered preview service 302 can also include a preview generator 310 that may generate preview content received on event bus 312 and store the preview content in the preview cache 140. For example, on an upload the filter 304 can initiate a preview generation by the preview generator 310, and when a user has requested a feed, the layered preview service 302 may store an authorization record associated with a content identifier and a user identifier to the authorization cache 308, which may be local to the layered preview service 302 or be remotely stored in the authorization cache storage 314. The preview service 306 is responsible for checking authorizations from the authorization cache 308 and then returning content previews from the preview cache 140. In the example of FIG. 3, the authorization cache 308 is a cache shared between the filter 304 and the preview service 306 identifying resources which may be served to users. In one embodiment, the authorization cache 308 is stored in volatile memory, while authorization cache storage 314 may be implemented in non-volatile storage.

On an upload or on detecting a put or post of preview-able content from the client producer 124, the filter 304 can extract a content reference to the content from a URL (or use the URL itself as the content reference) and then send the content along with the content reference to the preview generator 310. The filter may also store an authorization token for the current user in response to an upload action, allowing the user to subsequently preview the uploaded content. The preview generator 310 can store one or more content previews to the preview cache 140, potentially storing different sizes (e.g., 100px, 200px, 500px) and formats (e.g., HTML, JPEG, etc.). The storage location in the preview cache 140 may be dependent on the content reference or URL of the content or other identifiers of the type of preview (e.g., HTML, JPEG @100px, JPEG @500px, etc.).

The format of upload URLs and data to identify the associated content in the component storage 111 (to correlate to later GET requests) may be configurable based on a number of parameters. The content reference may be obtained by the filter 304 examining request and response headers, URL parameters, response body (addressable in a number of configurable ways including with XPath, XSLT, an attribute name or path of names in JSON), or, in the case of a servlet filter, request attributes or regular expressions or other pattern matching applied to any of the proceeding data sources. As the request is provided by the client, the response data generated by the server is most conventionally used.

Upon receiving a request for a feed at filter 304. The filter 304 can identify the associated content being returned from component storage 111 in a number of ways. In one embodiment, the filter 304 reads the responses and looks for certain conventional identifiers of a resource in the response. For instance, the filter 304 may look for an Atom entry's URL or ID, or may look for IDs and URLs in JSON responses or in an activity stream response. The filter may also use XSLT, XPath, an object oriented dot notation to address object oriented data such as JSON, regular expressions or other pattern matching applied to any of the response data including the response body or response headers.

Once a set of identifiers for a list of resources is identified, the filter 304 may send the list of IDs or URLs to the authorization cache 308 along with a user identifier.

The authorization cache 308 may in turn store each authorization along with a time stamp indicating when it was stored and the user identifier. The authorization cache 308 may use authorization cache storage 314, and in the case of the filter 304 and preview service 306 being in the same web application may use an application session, or any other form of cache or storage.

There may be a maximum size to the authorization cache 308 per user identifier or in total. For instance, if the maximum size per user was two hundred entries, then when the two hundred-and-first entry for a particular user identifier is placed in the authorization cache, the first entry for the user identifier would be removed based on the timestamp that the authorizations were stored to maintain a first-in-first-out order.

A parameter may be used to conditionally trigger generation of content previews by the preview generator 310. The parameter can be used if a client anticipated displaying content previews for the associated content in the response to minimize unnecessary authorizations.

The authorization cache 308 may be actively managed, with a worker thread looking for authorizations older than a configurable time (for instance, authorizations older than two minutes may be removed).

On receiving a request for a preview at the preview service 306, the incoming request to the preview service 306 can identify the content to be previewed by a content identifier which may include a resource URL. The preview service 306 can check the content identifier against the authorization cache 308. For all authorization cache entries for the user identifier and associated content which are older than a predefined threshold (for instance, two minutes), the entries can be removed from the authorization cache 308 and then ignored.

After removal of all expired authorization entries, if at least one entry remains for the combination of the user identifier and content identifier, the oldest such entry is removed (consumed) from the authorization cache 308. After removal of all expired authorization entries from the authorization cache 308, if no valid authorizations exist for the combination of user and file, the preview service 306 may make a direct authorization request to the component 110 or may simply refuse the request with an HTTP error code (such as error code 403 or 404).

If the authorization is successful, the preview content is served, which may include a response that allows an upstream component (such as an HTTP server) to stream the component 110. The net result is that the authorization cache 308 is kept relatively small, usually at most, the number of items in a page of results for each active user since items are added and quickly consumed, with the maximum size kept somewhat larger in case many browser windows are opened concurrently.

The preview service 306, or parts of it, may be implemented as a plugin to an HTTP Server or another HTTP server, may be implemented as a servlet, servlet filter, or any other component which can service HTTP requests. The preview service 306 may be implemented partially in a web application server (for the sub-component which checks access) and partially in an HTTP server (for the sub-component which serves files).

The filter 304 may be implemented as a servlet filter (as in a web application), a web proxy including a forwarding proxy, reverse proxy or ICAP appliance, or as a plugin to an HTTP server.

In place of a network file service (NFS), another network or cloud based storage system may be used. The preview generator 310 may work in other ways, such as by polling a component service or storage for files to convert. The event notification to the preview generator 310 may be sent directly from the component 110 and not rely on the filter 304.

Figure 4:
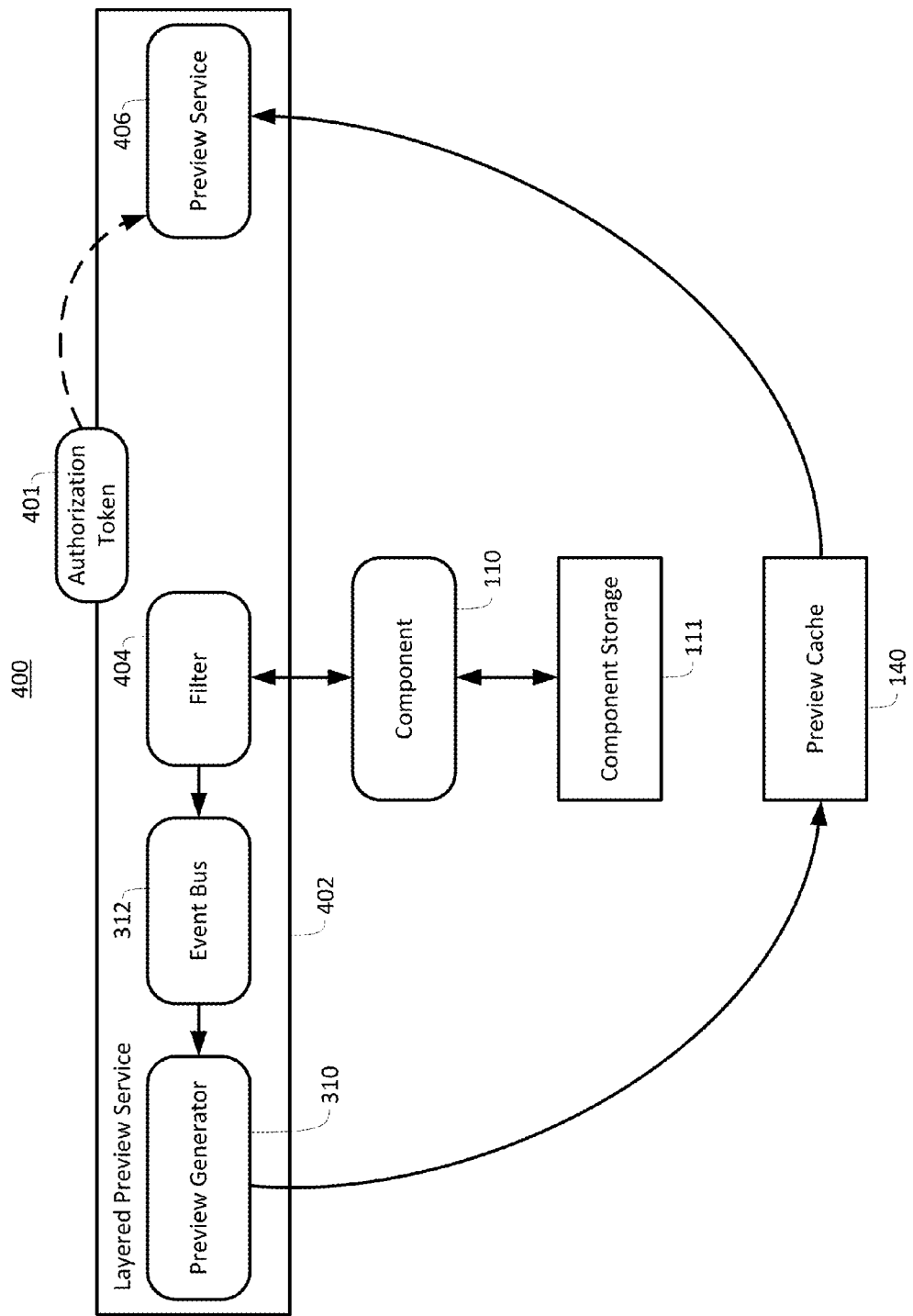
FIG. 4 depicts another example dataflow for preview serving according to an embodiment.

FIG. 4 depicts another example dataflow 400 for preview serving according to an embodiment. In the example of FIG. 4, rather than directly implementing the authorization cache 308 of FIG. 3, authorization is implemented by returning an authorization token 401 that authorizes access. A private key of an asymmetric pair is used to encrypt a content identifier or set of identifiers, optionally a user identifier and timestamp. This information is then added by filter 404 with content from component 110 in authorization token 401 as part of a data feed returned to the client consumer 134 of FIG. 1. The authorization token 401 is added to a request for the preview by the client consumer 134 of FIG. 1. In one embodiment, the encrypted content identifiers are stored in a cookie with a domain and path designated so as to instruct the user-agent (for instance, web browser) to send the cookie to the preview service 406. The preview service 406 may consume the authorization by removing the cookie or altering the cookie so as to remove individual authorizations from a set. Multiple private keys may be trusted by a single preview service 406, allowing for multiple content sources to authorize a user's access. One private key may be the key of the preview service 406 itself, allowing the preview service 406 to take an authorization set stored in a cookie, remove (consume) one or more authorizations, and restore a new authorization for a subset of the original content references. Preview service 406 can use a public key of a public/private pair associated with the authorization token 401 to decrypt the signature and verify access. In one embodiment, the private/public keys used are the secure sockets layer (SSL) keys for HTTPS access to the preview cache 140. This allows the preview service 406 to operate completely independently without any pre-shared key or information with the filter 404 or component 110. This embodiment allows further isolation of the filter 404 and preview service 406, allowing them to be implemented separately without a shared server-side cache and allows the preview service 406 to be placed at the edge of the network 106 of FIG. 1 or use a content distribution network.

Figure 5:
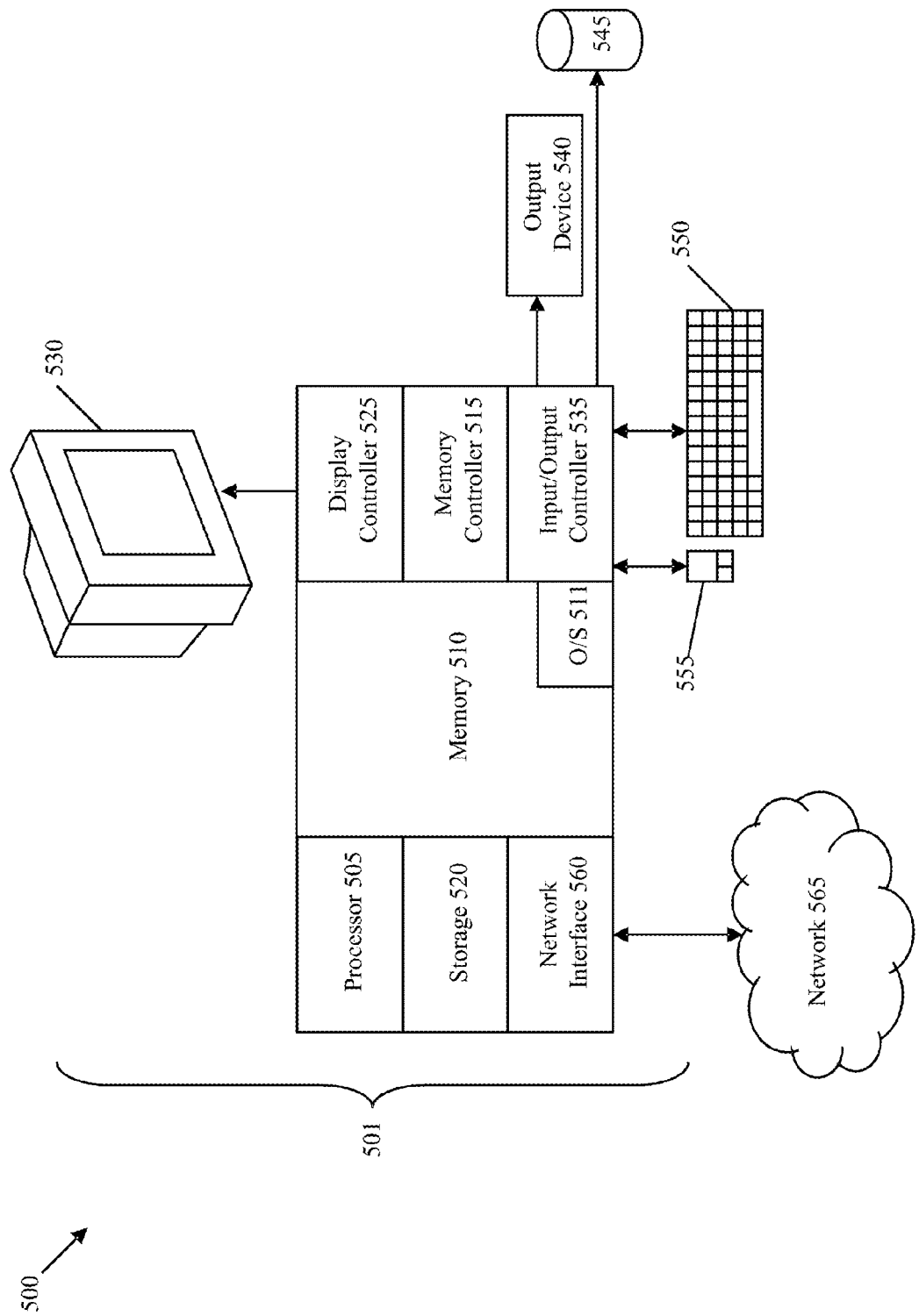
FIG. 5 depicts a further example of a block diagram of a system for preview serving.

FIG. 5 illustrates a block diagram of a system 500 for preview serving. The processes as previously described can be implemented in system 500 in hardware, software (e.g., firmware), or a combination thereof as part of a computer, such as a personal computer, tablet computer, handheld device, workstation, minicomputer, or mainframe computer. The system 500 therefore includes computer 501 as illustrated in FIG. 5. The system 500 is a further example of the system 100 of FIG. 1, where the computer 501 is an embodiment of one of the client producer devices 103A-N of FIG. 1, the client consumer devices 104A-N of FIG. 1, and/or a server upon which one or more elements of the layered preview service 102 of FIG. 1 can be implemented.

In an exemplary embodiment, in terms of hardware architecture, as shown in FIG. 5, the computer 501 includes a computer processor 505 and memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The computer processor 505 is a processing device for executing software, particularly software stored in storage 520, such as cache storage, or memory 510. The computer processor 505 can be any custom made or commercially available computer processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the computer processor 505.

The component 110 of FIG. 1 can be located in the memory 510 in one instance of the computer 501, and the component storage 111 and preview cache 140 of FIG. 1 may be located in storage 520 in one or more other instances of the computer 501.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially controls the execution of other computer programs and provides scheduling, input-output control, file and data management, memory management, and communication control and related services. The filter 304, preview service 306, preview generator 310, filter 404, and preview service 406 of FIGS. 3 and 4 are other examples of executable instructions that can reside in memory 510 in one or more instance of the computer 501 that form the layered preview service 302, 402 of FIGS. 3 and 4.

In an exemplary embodiment, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565, such as network 106 of FIG. 1. The network 565 can be an IP-based network for communication between the computer 501 and any external server, client and the like via a broadband connection. The network 565 transmits and receives data between the computer 501 and external systems. In an exemplary embodiment, network 565 can be a managed Internet Protocol (IP) network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the computer processor 505 is configured to execute instructions stored within the memory 510, to communicate data to and from the memory 510, and to generally control operations of the computer 501 pursuant to the instructions.

Figure 6:
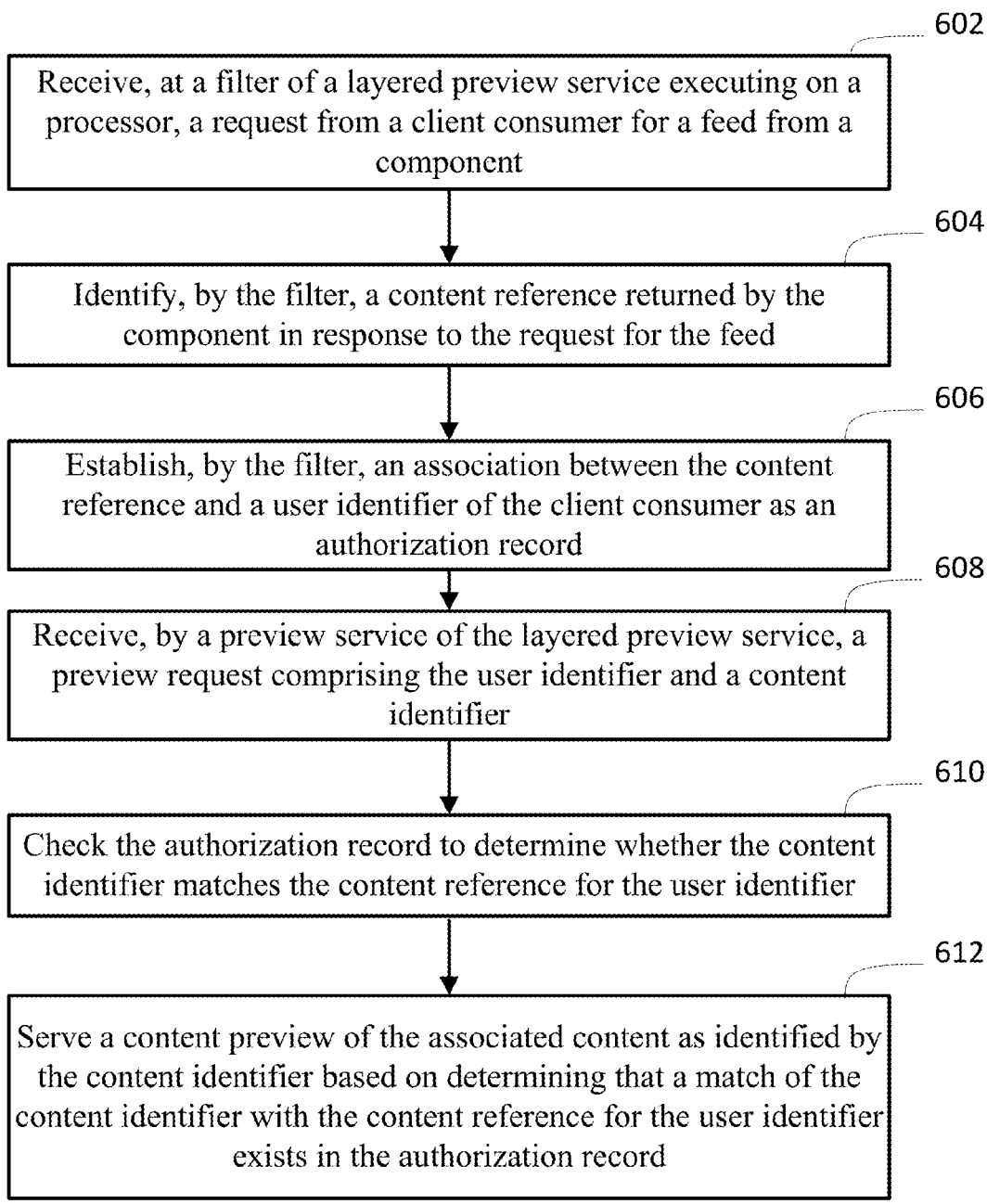
FIG. 6 depicts a flow diagram of a process for preview serving according to an embodiment.

Turning now to FIG. 6, a process 600 for preview serving will be described in accordance with an exemplary embodiment. The process 600 is described in reference to FIGS. 1-6 and can be implemented by the layered preview service 102, 302, 402 of FIGS. 1, 3, and 4. When embodied in the computer 501 of FIG. 5, a computer processor 505 can be configured to perform the process 600.

With respect to the example of FIG. 3, associated content can be received at the filter 304 from a client producer 124 of FIG. 1. The filter 304 can extract a content reference to the associated content and monitor a plurality of responses to requests for feeds for the content reference, such as data feed requests to the component 110 from client consumer 134. The associated content from the filter 304 may be passed to preview generator 310 with the content reference, where the preview generator 310 generates the content preview based on a file type of the associated content. The content preview of the associated content can be stored with the content reference to a preview cache 140 that is accessible by the preview service 306.

At block 602, filter 304 of layered preview service 302 receives a request from a client consumer 134 for a feed from the component 110, e.g., a web page and associated data referenced by the web page. At block 604, filter 304 identifies a content reference returned by the component 110 in response to the request for the feed, where the content reference may refer to one or more content references, e.g., a set of content references. At block 606, filter 304 establishes an association between the content reference and a user identifier of the client consumer 134 as an authorization record. The authorization record may be stored in authorization cache 308, e.g., in authorization cache storage 314.

At block 608, preview service 306 of the layered preview service 302 receives a preview request that includes the user identifier and a content identifier. When the authorization cache 308 is used, the preview service 306 can search a plurality of authorization records in the authorization cache 308 to locate the authorization record based on receiving the preview request.

At block 610, the authorization record is checked to determine whether the content identifier matches the content reference for the user identifier. At block 612, a content preview of the associated content is served by the preview service 306 as identified by the content identifier based on determining that a match of the content identifier with the content reference for the user identifier exists in the authorization record.

As previously described, time stamps may be included in the authorization cache 308 indicating when each of the authorization records was created. An age of each of the authorization records can be monitored based on the time stamp. One or more of the authorization records can be removed from authorization cache 308 based on the age exceeding a maximum age threshold. The authorization cache 308 may have a maximum number of entries defined per user, and older entries in the authorization cache 308 are overwritten on a first-in-first-out basis.

Also as previously described with respect to FIG. 4, rather than storing authorization records in the authorization cache 308, each authorization record can be implemented as an authorization token 401, where the content reference and the user identifier are encrypted as encrypted data in the authorization token 401. The authorization token 401 is returned to the client consumer 134 in the feed. The authorization token 401 can be detected by the preview service 406 in the preview request. The preview service 406 may use a public key to decrypt the encrypted data in the authorization token 401 by the preview service 406. A timestamp can be incorporated in the encrypted data of the authorization token 401. The timestamp may be checked upon decrypting the encrypted data to verify that authorization to the content preview has not expired.

Technical effects include externalizing a preview generating service that may generate previews on remote machines using a layered preview service. Embodiments allow application specific content level security with minimal changes to application components. Embodiments can enforce application specific security controls on externally stored previews, and may support preview generation and servicing for legacy components that do not have preexisting preview generation capabilities.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for serving content previews from a preview service for a component having associated content, the method comprising:
   receiving, at a filter of a layered preview service executing on a processor, a request from a client consumer for a feed from the component;
   identifying, by the filter, a content reference returned by the component in response to the request for the feed;
   establishing, by the filter, an association between the content reference and a user identifier of the client consumer as an authorization record;
   storing the authorization record in an authorization cache;
   receiving, by a preview service of the layered preview service, a preview request comprising the user identifier and a content identifier;
   searching a plurality of authorization records in the authorization cache to locate the authorization record based on receiving the preview request;
   checking the authorization record to determine whether the content identifier matches the content reference for the user identifier;
   authorizing serving of a content preview from a preview cache based on locating the authorization record in the authorization cache; and
   serving, from the preview cache that is managed by the layered preview service, the content preview of the associated content as identified by the content identifier based on determining that a match of the content identifier with the content reference for the user identifier exists in the authorization record, wherein the content preview comprises one or more reduced-size images that provide a visual indication as to the associated content without including underlying data of the associated content, and the preview cache stores a plurality of content previews associated with different components.

2. The method of claim 1, further comprising:
   storing a time stamp in the authorization cache indicating when each of the authorization records was created;
   monitoring an age of each of the authorization records based on the time stamp; and
   removing one or more of the authorization records from authorization cache based on the age exceeding a maximum age threshold.

3. The method of claim 1, wherein the authorization cache has a maximum number of entries defined per user and older entries in the authorization cache are overwritten on a first-in-first-out basis.

4. The method of claim 1, further comprising:
   receiving the associated content at the filter from a client producer;
   extracting the content reference to the associated content; and
   monitoring a plurality of responses to requests for feeds for the content reference.

5. The method of claim 4, further comprising:
   passing the associated content from the filter to a preview generator with the content reference, wherein the preview generator generates the content preview based on a file type of the associated content; and
   storing the content preview of the associated content with the content reference to the preview cache that is accessible by the preview service.

6. A system for serving content previews from a preview service for a component having associated content, the system comprising:
   a memory having computer readable instructions; and
   a processor for executing the computer readable instructions, the computer readable instructions including:
   receiving, at a filter of a layered preview service, a request from a client consumer for a feed from the component;
   identifying, by the filter, a content reference returned by the component in response to the request for the feed;
   establishing, by the filter, an association between the content reference and a user identifier of the client consumer as an authorization record;
   storing the authorization record in an authorization cache;
   receiving, by a preview service of the layered preview service, a preview request comprising the user identifier and a content identifier;
   searching a plurality of authorization records in the authorization cache to locate the authorization record based on receiving the preview request;
   checking the authorization record to determine whether the content identifier matches the content reference for the user identifier;
   authorizing serving of a content preview from a preview cache based on locating the authorization record in the authorization cache; and
   serving, from the preview cache that is managed by the layered preview service, the content preview of the associated content as identified by the content identifier based on determining that a match of the content identifier with the content reference for the user identifier exists in the authorization record, wherein the content preview comprises one or more reduced-size images that provide a visual indication as to the associated content without including underlying data of the associated content, and the preview cache stores a plurality of content previews associated with different components.

7. The system of claim 6, further comprising:
   storing a time stamp in the authorization cache indicating when each of the authorization records was created;
   monitoring an age of each of the authorization records based on the time stamp; and
   removing one or more of the authorization records from authorization cache based on the age exceeding a maximum age threshold.

8. The system of claim 6, wherein the authorization cache has a maximum number of entries defined per user and older entries in the authorization cache are overwritten on a first-in-first-out basis.

9. The system of claim 6, further comprising:
   receiving the associated content at the filter from a client producer;
   extracting the content reference to the associated content; and
   monitoring a plurality of responses to requests for feeds for the content reference.

10. The system of claim 9, further comprising:
passing the associated content from the filter to a preview generator with the content reference, wherein the preview generator generates the content preview based on a file type of the associated content; and
storing the content preview of the associated content with the content reference to the preview cache that is accessible by the preview service.

11. A computer program product for serving content previews from a preview service for a component having associated content, the computer program product comprising a computer readable storage medium having program code embodied therewith, the program code executable by a processor for:
receiving, at a filter of a layered preview service executing on the processor, a request from a client consumer for a feed from the component;
identifying, by the filter, a content reference returned by the component in response to the request for the feed;
establishing, by the filter, an association between the content reference and a user identifier of the client consumer as an authorization record;
storing the authorization record in an authorization cache;
receiving, by a preview service of the layered preview service, a preview request comprising the user identifier and a content identifier;
searching a plurality of authorization records in the authorization cache to locate the authorization record based on receiving the preview request;
checking the authorization record to determine whether the content identifier matches the content reference for the user identifier;
authorizing serving of a content preview from a preview cache based on locating the authorization record in the authorization cache; and
serving, from the preview cache that is managed by the layered preview service, the content preview of the associated content as identified by the content identifier based on determining that a match of the content identifier with the content reference for the user identifier exists in the authorization record, wherein the content preview comprises one or more reduced-size images that provide a visual indication as to the associated content without including underlying data of the associated content, and the preview cache stores a plurality of content previews associated with different components.

12. The computer program product of claim 11, further comprising:
storing a time stamp in the authorization cache indicating when each of the authorization records was created;
monitoring an age of each of the authorization records based on the time stamp; and
removing one or more of the authorization records from authorization cache based on the age exceeding a maximum age threshold.

\* \* \* \* \*